Figure 1:
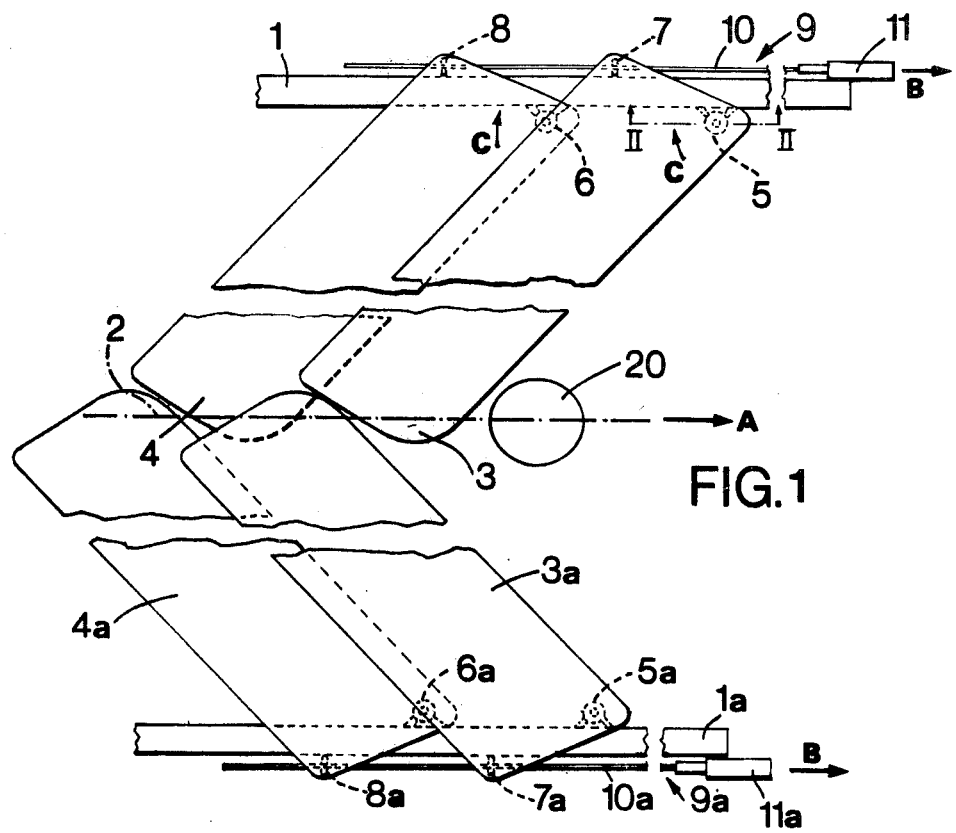

United States Patent [19]

Clary

[11] 4,130,982

[45] Dec. 26, 1978

[54] FRUIT HARVESTING MACHINE

[75] Inventor: Roger Clary, Loudun, France

[73] Assignee: Howard Machinery Limited, Bury St. Edmunds, England

[21] Appl. No.: 796,988

[22] Filed: May 16, 1977

[30] Foreign Application Priority Data

May 19, 1976 [FR] France .................................. 76 15106

[51] Int. Cl.² ........................................... A01D 46/00
[52] U.S. Cl. ..................................................... 56/330
[58] Field of Search ...................... 56/328 R, 330, 301, 56/36–49

[56] References Cited

U.S. PATENT DOCUMENTS

| | | | |
|---|---|---|---|
| 3,225,894 | 12/1965 | Weygandt et al. | 56/330 X |
| 3,255,578 | 6/1966 | Pertics | 56/330 |
| 3,276,194 | 10/1966 | Mohn et al. | 56/330 |
| 3,325,984 | 6/1967 | Christie et al. | 56/330 |
| 3,449,895 | 6/1969 | Pertics | 56/330 |

Primary Examiner—Russell R. Kinsey
Attorney, Agent, or Firm—Wegner, Stellman, McCord, Wiles & Wood

[57] ABSTRACT

A fruit harvesting machine, especially suitable for grapes, consists of a mobile frame which straddles the vines so that longitudinal frame members extend down each side of the central axis of the frame. Base plates for catching the falling fruit extend inwards from the longitudinal members and are pivotable to allow the vines to pass along the machine. A resilient attachment for each base plate biases the plates towards their extended positions and includes internal and external sleeves between which is a resilient sleeve pre-stressed to urge the internal sleeve, attached to the plate, to rotate relative to the external sleeve into the extended position.

5 Claims, 2 Drawing Figures

FRUIT HARVESTING MACHINE

This invention relates to a fruit harvesting machine for harvesting fruit from plants, bushes or the like and particularly but not exclusively, to grape harvesting machines.

Grape harvesting machines generally have longitudinal frame members spaced apart in the lateral direction to define a passageway between the members and the frame members carry devices for shaking the vines which are located in the passageway. The grapes are detached by the shaking action and fall onto a movable base member which forms the base of the passageway above ground level. The base member should be as completely closed as possible around the vine stems as they pass through the passageway. Generally the base member is formed by two groups of members arranged symmetrically to each side of the longitudinal central axis of the machine and close together along said axis, the members extending transversely of said axis and being individually movable away from said axis. Each of the members may be pivotally mounted on the associated frame member at its end remote from the central axis. When passing the vine stems each of the base members pivots so that its free end moves away from the central axis and then is returned to its initial position by a resilient member. Sometimes the base members are arranged to be directed towards the rear of the machine and to lie in a plane inclined downwardly, forwardly and outwardly.

Known base members have disadvantages relating to the pivoting of the members and to the resilient members employed. The pivot is generally situated close to the ground and therefrom subjected to the corrosive action of particles in the soil thrown up by the passage of the machine. Wear of the pivots and the bearings can be very high. In addition location of resilient members in the form of springs under the base members and connected between the members and the frame members can give rise to the resilient members being damaged by the branches of the vines catching in the said members.

To obviate at least some of these disadvantages the invention provides a simple arrangement, easily manufactured and requiring little maintenance and replacement of broken or worn parts, and having long life.

According to the invention a fruit harvesting machine comprises a mobile frame including longitudinal frame members located symmetrically and to the sides of the central longitudinal axis of the frame, two groups of base plate members each group extending from one of its frame members towards said axis and each plate member being pivotally attached at one end to a frame member so that the free end is movable away from said axis, and resilient pivot means for each plate member biasing the free end of the plate members towards said axis, the resilient pivot means being in the form of an external sleeve fixed to the associated frame member, an internal sleeve attached to said one end of each plate member, and a resilient sleeve between the internal and external sleeves and pre-stressed to urge the internal sleeve to rotate relative to the external sleeve, the plate members forming a receiving surface for fruit dislodged by the machine, and the arrangement enabling the plate members to be displaced to allow the passage of fruit bearing plants or bushes between the frame members during forward movement of the machine.

Figure 2:
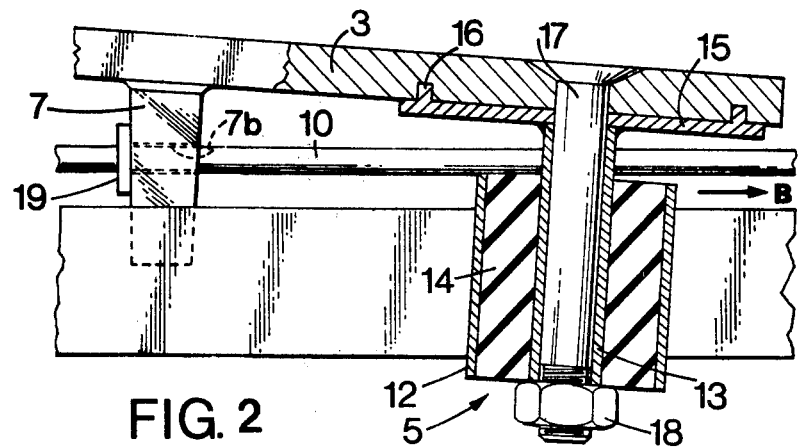

Further features of the invention appear from the following description of an embodiment of the invention given by way of example only and with reference to the accompanying drawings, in which:

FIG. 1 is a schematic plan view of part of the base plate member assembly of a grape harvesting machine according to the invention; and FIG. 2 is a section on the line II—II in FIG. 1.

Referring to the drawings, side frame members 1 and 1a (FIG. 1) form part of a grape harvester machine, the unshown part of the machine being of known form, for example of the kind described in our U.S. Pat. No. 4,051,649. The machine has a central longitudinal axis 2 and two groups of base plates 3, 4 and 3a, 4a, each plate being pivotally mounted at 5, 6, 5a and 6a respectively at one end of the plates to the associated side members 1 and 1a. The groups of plates 3, 4 and 3a, 4a are symmetrically arranged with respect to the axis 2 and each group constitutes one half of the base receiving surface onto which fruit dislodged by the machine falls.

Each of the plates can move about its respective pivot 5, 6, 5a and 6a and such movement is limited by an associated abutment member 7, 8, 7a and 8a which engages with the associated side member 1 or 1a. In this position, as shown in FIG. 1, the plates are in their position of maximum extension of their free ends from the side members 1 and 1a and in this position the free ends are to the rear of the ends pivoted to the side members relative to the direction of forward movement A of the machine. This arrangement is to avoid too large a movement of the plates about their pivots when the machine passes vine stems 20.

In the region of the ends of the plates adjacent but spaced from the pivots, each plate is connected to devices 9 and 9a which enable controlled pivoting and retraction of the plates. The devices 9 and 9a are each in the form of a cable 10 and 10a coupled at one of its ends to a drive member 11 or 11a, preferably, as shown, a jack, which effects movement of the cables 10 and 10a in the direction B. Coupling of the plates and the cables is through the abutment members 7, 8, 7a and 8a. As seen in greater detail in FIG. 2, each of the plates includes a resilient return member associated with the pivots 5, 6, 5a and 6a which urges the plates towards the position shown in FIG. 1.

The return members are shown in more detail in FIG. 2 and each include an outer sleeve 12 fixed to the associated side member 1 or 1a, an inner sleeve 13 connected to the associated plate, and a resilient annular member 14 arranged in compression between the two sleeves 12 and 13. The inner sleeve 13 carries a platform 15 at its upper end which supports the associated plate. The platform 15 includes pins 16 co-operating with corresponding recesses formed in the plate to fix the platform 15 relative to the plate. The plates may include a greater number of recesses than pins to enable the position of the plate relative to the platform to be adjusted. The plates are each fixed in position by a shaft 17 extending from the plate through the platform 15 and the internal sleeve 13 so that a nut 18 can be located on its end opposite to the plate to fix the shaft relative to the sleeve 13. The abutment members 7, 8, 7a, 8a are in the form of fingers extending below the associated plates and having lengths sufficient to engage the associated side member 1 or 1a. The members have openings 7b through which the cables 10 and 10a pass and the cables carry discs 19 which engage with the fingers.

In the position shown in FIG. 1 the abutment members 7, 8, 7a and 8a engage the side members 1 and 1a under the action of the sleeves 14 which are torsionally pre-stressed on assembly. The pre-stressing of the sleeve 14 is achieved at the time of mounting the platform 15 on the associated plate, for example by displacing the pins 16 relative to the seatings from an unstressed condition of the sleeve 14 while the plate is abutting the side member by means of the finger in such a direction that the restoring force or torque of the sleeve urges the finger against the side member. In effect this restoring force tends to rotate the sleeve 13 relative to the sleeve 12.

It will be noted that, with reference to FIG. 2, the pivot axes of the plates are inclined from the vertical in the plane of section II—II so as to enable overlapping of consecutive plates (as shown in FIG. 1). In addition the pivot axes are inclined from the vertical in a plane perpendicular to the plane II—II in a direction such that each plate is inclined downwardly outwardly from the central axis 2, as well as being inclined forwardly downwardly of the rear edge of the plate.

When the machine moves in the direction A, the vine stems 20 cause each of the plates in turn to pivot about their respective pivots in a direction C which causes further torsional elastic deformation of the sleeve 14 so that after the stem 20 has passed, the plate resumes its initial position urged with its abutment member against the respective side member.

If any vine stems become jammed in the central passageway of the machine it may be necessary to reverse the machine in order to dislodge the stems. To drive the machine in the direction opposite to direction A the plates 3, 4, 3a and 4a have to be retracted by operation of the devices 9 and 9a. Actuation of the rams 11 and 11a in the direction B causes the plates to rotate in the direction C so that their free ends are retracted from the central axis 2 and the stems can thereby be released.

It will be appreciated that the base plate members of the invention are capable of providing a substantially closed receiving surface for fruit dislodged by the fruit harvesting machine while still enabling the stems of the fruit-bearing plant to pass along the machine. The base member assembly is robust, hard-wearing and substantially maintenance free.

What we claim as our invention and desire to secure by Letters Patent of the United States is:

1. A fruit harvesting machine comprising a mobile frame including longitudinal frame members located symmetrically and to either side of the central longtiudinal axis of the frame, two groups of base plate members each group extending from one of the frame members towards said axis and each plate member being pivotally attached at one end to a frame member so that the free end is movable away from said axis, and resilient pivot means for each plate member biasing the free ends of the plate members towards said axis, the resilient pivot means being in the form of an external sleeve fixed to the associated frame member, an internal sleeve attached to said one end of each plate member, and a resilient sleeve between the internal and external sleeves and pre-stressed to urge the internal sleeve to rotate relative to the external sleeve, the plate members forming a receiving surface for fruit dislodged by the machine, and the arrangement enabling the plate members to be displaced to allow the passage of fruit bearing plants or bushes between the frame members during forward movement of the machine.

2. A machine according to claim 1 comprising an abutment member associated with each plate member for limiting the possible pivoting movement of the free end of the member, the abutment member being arranged to abut a portion of the associated frame member under the action of the resilient means.

3. A machine according to claim 1 wherein each group of plate members is connected to retraction means disposed adjacent either frame member whereby the plate members can be pivoted to move their free ends away from the central axis.

4. A machine according to claim 3 wherein the retraction means includes an element coupled to each of the plate members of each group of members at a position spaced from the pivot means to the side of the pivot means remote from said longitudinal axis, and drive means connected to the element, operation of the drive means moving the element to pivot the plate members against the action of the resilient means.

5. A machine according to claim 1 wherein the external sleeve is connected to the associated side frame member through a platform having pins which engage in corresponding recesses in the frame member, there being more recesses than pins.

* * * * *